Figure 1:
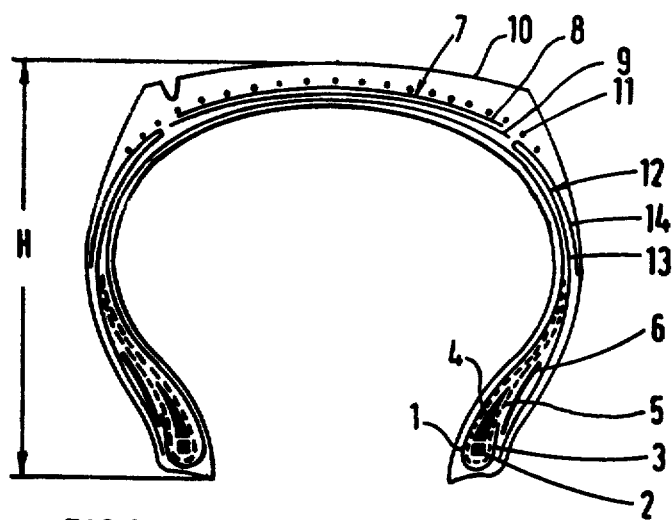

United States Patent [19]

Mezzanotte

[11] 4,047,551
[45] Sept. 13, 1977

[54] RADIAL TIRES PROVIDED WITH IMPROVED SIDEWALL-STIFFENING STRUCTURE

[75] Inventor: Mario Mezzanotte, Milan, Italy
[73] Assignee: Industrie Pirelli S.p.A., Milan, Italy
[21] Appl. No.: 705,259
[22] Filed: July 14, 1976
[30] Foreign Application Priority Data
 Sept. 24, 1975 Italy .................................. 27561/75
[51] Int. Cl.² .......................... B60C 9/10; B60C 9/18
[52] U.S. Cl. .................................. 152/354; 152/355; 152/361 R; 152/362 R
[58] Field of Search ............... 152/354, 355, 357, 374, 152/362 R, 362 CS, 361 R

[56] References Cited
U.S. PATENT DOCUMENTS

| | | | |
|---|---|---|---|
| 3,481,386 | 12/1969 | Menell et al. | 152/354 |
| 3,509,930 | 5/1970 | Mirtain | 152/354 |

Primary Examiner—Drayton E. Hoffman
Attorney, Agent, or Firm—Stevens, Davis, Miller & Mosher

[57] ABSTRACT

A pneumatic tire for a motor vehicle having a tread, beads and a radial carcass combines a carcass having radially disposed cords which extend from about one bead cord to about the other bead cord and having a strip of metal cords which extend substantially perpendicularly to the circumferential axis of the tire, a breaker structural member disposed between the carcass and tread having at least two superimposed layers of cords which are disposed in each layer to cross those of the adjacent layer and a layer of heat shrinkable cords disposed parallel to the equatorial plane of the tire, and a sidewall reinforcing structure of cords which are disposed radially outwardly of the radially disposed cords of the carcass. The cords of the sidewall reinforcing plies are parallel to each other and are inclined at an angle of 20° to 30° with respect to the circumferential line of the tire. The reinforcing ply for the sidewall is folded and the fold is disposed between the carcass and the breaker structure. The longer skirt extends from the fold to the bead core cord while the shorter skirt is disposed axially outwardly from the longer skirt and extends from the fold through about one-half of the section height of the tire.

8 Claims, 2 Drawing Figures

RADIAL TIRES PROVIDED WITH IMPROVED SIDEWALL-STIFFENING STRUCTURE

The present invention relates generally to radial tires for motor vehicles, and more particularly to such tires provided with a carcass formed with cords lying in radial planes or forming small angles with the radial planes and to such tires having a structure which stiffens the sidewalls of the tire.

It is known that tires having a radial carcass are usually provided with an annular reinforcing structure, arranged between the carcass and the tread. The reinforcing structure is provided to withstand the forces due to the pressure inside the tire and the tension and compression stresses to which the tire is subjected in use. The reinforcing structure is particularly important when the tire is to be employed at a high speed.

Specifically, for high performance radial tires, it has been found that a particularly suitable reinforcing structure has a pair of layers of metal cords, parallel to one another in each layer, crossed with respect to the cords of the adjacent layer, and inclined at a relatively small angle (from 10° to 35° ) with respect to the equatorial axis of the tire, with at least one strip of nylon cords arranged thereon and oriented along the circumferential direction of the tire. Tires built up in this way are particularly advantageous because they have good road holding and steering safety characteristics even at high speeds.

As known, the sidewalls of radial tires are highly flexible, both in the vertical and in the transverse sense.

The fact that the sidewalls are flexible in the vertical sense represents an advantage, because this ensures good driving comfort of the tire; the transversal flexibility involves instead the disadvantage of an excessive deformation of the tire under stresses perpendicular to its equatorial plane, for instance when it runs by drift or along a curved trajectory or under the thrust of a wind blowing laterally on the vehicle on which the tire is fitted. It may happen that, under such conditions, the tire suffers an excessive deformation, so that its sidewall comes into contact with the ground, which adversely effects its road holding characteristics and its useful life.

Hence, there is a need to stiffen the sidewalls of the radial tires. However, it is to be borne in mind that if the reinforcing structure is too rigid, the tire will not be able to reduce the effects of the transversal stresses due to ground irregularities.

In general, to stiffen the sidewalls, strips of textile or metal cords have been introduced, usually in their lower zone, at pre-established inclinations about the bead cores (the so-called 'flippers') and/or in the axially outer zone with respect to the carcass turn-ups. These reinforcements, which extend radially from the bead core zone to even one-half of the section height of the tire, improve the transversal rigidity of the latter, without causing any substantial reduction in its radial flexibility.

In this way, the tire comes to possess appreciable characteristics as regards the above cited features, which result in a good behavior of the same in normal travelling conditions and also at high speed. However, it has been determined that such a tire, if it is intended to work at higher speed conditions, for instance of the order of 250 km/h, can be further improved, in particular as regards its transversal rigidity.

One subject of the invention is therefore to provide a pneumatic tire for motor vehicles which is devoid of the foregoing disadvantages. Still another object of the invention is to provide a pneumatic tire for motor vehicles adapted to be driven safety at high speeds. A still further object of the invention is to provide a vehicle tire of the radial type having improved transverse rigidity.

Figure 2:
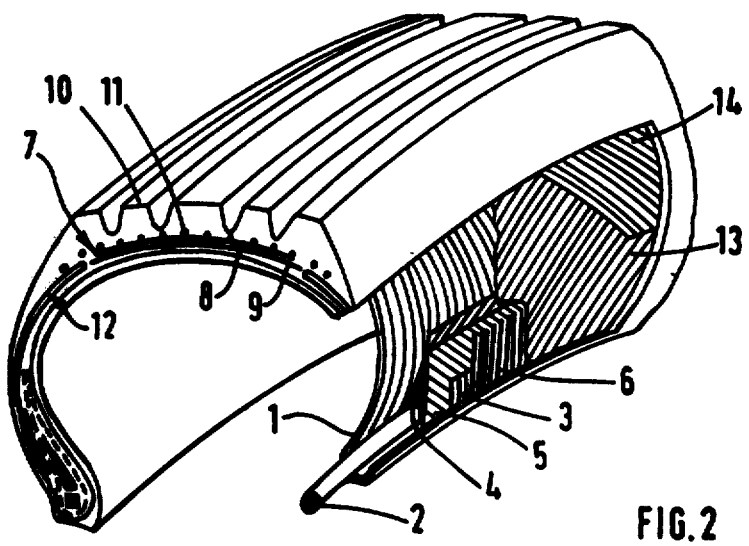

Other objects will become apparent from the following description with reference to the accompanying drawing wherein FIG. 1 is a section taken along a radial plane of one embodiment of the invention; and FIG. 2 is a fragmentary perspective view of the tire of FIG. 1 with parts broken away at the shoulder and sidewall of the tire.

Accordingly, the foregoing objects and others are accomplished in accordance with this invention by providing a pneumatic tire for vehicle wheels which comprises a radial carcass, a tread and a breaker arranged between the carcass and the tread, in which the carcass is constituted by at least one ply of cords lying in substantially radial planes, the cords extending from one bead to the other, and being turned up about the bead core contained in each bead from the inner side towards the outer side of the tire, each bead comprising a filling of high rigidity rubber arranged on the relative core, the lower zone of each sidewall comprising at least one strip of metal cords arranged with said cords inclined at 90° with respect to the circumferential lines of the tire, in an axially outer position with respect to the turn-up of said carcass and extending radially from the core zone to at least a height equal to the 45% of the section height of the tire, and a breaker member which comprises at least two superimposed layers of cords of threads or wires of a material selected between textile or metallic material, having a width corresponding at least to that of the tread, the cords of the breaker being parallel to one another in each layer and crossed with respect to those of the adjacent layer, and being inclined at an angle ranging between 10° and 35° with respect to the equatorial plane of the tire and, in a radially outer position with respect to said two layers, at least one strip of textile cords arranged in a direction parallel to the equatorial plane of the tire, having a width greater than that of said two layers, said textile cords being made of a material which reduces in length under the action of heat, characterized in that the tire also comprises, in each sidewall, a reinforcement made of a fabric of cords of threads or wires of a material selected between textile or metallic material, arranged in an axially outer position with respect to the carcass and to its turn-up in such a way that the cords, in the sidewall, parallel to one another, are inclined, with respect to the circumferential lines of the tire, at an angle ranging between 20° and 30°, the sidewall reinforcement being so folded as to have a greater skirting extending from the bead core zone as far as the tire shoulders and a smaller skirting extending from the shoulder zone as far as one-half of the section height of said tire, the folding edge of said reinforcement lying substantially adjacent to the layers of cores of threads or wires of a material selected between textile or metallic material of said breaker and underlying said strip of textile cords of the breaker itself.

Preferably, the reinforcement of the above described sidewall has its smaller skirting arranged in an axially outer position; moreover, the strip of textile cords of the breaker covers the folding edge of the reinforcement for an extension comprised between 10% and 30% of the extension of the smaller skirting of the latter.

As said above, the reinforcement of the sidewalls is constituted by cords of threads or wires of a material which can be metallic or textile; in the specific case that the cords are of textile material, they are preferably made of polyamide, either of the aliphatic type, known as nylon 6 or nylon 66, or of totally aromatic polyamide (aramide), known under the trade names of "Fiber B", or "Kevlar" sold by E. I. du Pont de Nemours of Wilmington, Delaware. The cords are inclined at an angle ranging between 20° and 30° with respect to the circumferential lines of the tire and, moreover, they have an inclination which in the above specified range of values varies along the travel of the cords from the bead zone to the shoulder.

In practice, the cords of the sidewall reinforcement which are inclined at the bead zone at an angle of for instance 23°, have at the sidewall top, in the area of the greater skirting, an inclination of 20° and, in the area of the smaller skirting, an inclination of 25°.

It has been found that said reinforcement imparts to the sidewalls a high transversal rigidity, reducing to the minimum the deformations of the upper portion of the sidewall by virtue of the presence, in that portion, of the superimposition of the smaller skirting of the reinforcement on the greater skirting. Moreover, the presence of the folding edge of the reinforcement in a position adjacent to the layers of textile or metallic cords of the breaker constitutes practically an extension of the breaker, so as to impart to the tire, together with the superimposition, at the shoulder, of the breaker strip of textile cords arranged longitudinally on the smaller skirting of the reinforcement, a gradual reduction of rigidity between the breaker and the sidewall.

In this way it is possible to avoid the disadvantages due to detachments which take place, at the end of the breaker layers, between the latter and the surrounding rubber. The rigidity decreases gradually from the upper zone of the sidewall as far as the bead zone. In fact, at the point where the smaller skirting of the reinforcement terminates, corresponding to one half of the section height of the tire, there are, besides the textile or metallic cords of the greater skirting of the textile reinforcement, the metallic cords of the strip arranged in an axially outer position with respect to the carcass turn-up, which are inclined at 90° with respect to the circumferential lines of the tire and, preferably, also at least one flipper constituted by a strip of textile or metallic cords, inclined at an angle ranging between 20° and 45° with respect to the circumferential lines, which is wound up about the bead core and extends as far as about one-half of the section height. Alternatively, a rubber strap of considerable hardness can be used in place of the flipper, and it winds up the bead core like a flipper would do.

Preferably, in order to better graduate the rigidity in the passage between the upper zone and the lower zone of the sidewall, the strip of metal cords present in the latter zone is constituted by cords of the so-called "high elongation" type, namely cords whose elementary wires and strands are all wound up in the same sense.

It has been noted that the tire provided by the invention has a good performance, both in normal use and at high speed, as regards road holding and running stability, with an insignificant reduction of its radial flexibility.

The present invention will be better understood with reference to the attached drawing.

The tire illustrated in the drawing is an automobile tire having a carcass which is constituted by a single ply of nylon cords, lying in radial planes, which are turned up about the bead core 2 from the inside towards the outside, the turn-up portion 3 extending radially in the bead zone.

On the bead core 2, provision is made of a filling of elastomeric material 4, having a Shore A hardness of 90°, which extends in the sidewall zone as far as a height equal to 20% of the section height H of the tire.

Moreover, a flipper 5, constituted by a strip of textile cords which are parallel to one another and are inclined at an angle of 35° with respect to the circumferential lines of the tire, is wound up about the bead core 2, between the latter and the carcass ply.

The ends of said strip, staggered from one another as usually, terminate in the bead zone at a height equal to 50% of the section height H of the tire.

In axially outer position with respect to the turn-up portion 3 of the carcass ply, there is the strip 6 of metal cords, which are parallel to one another and oriented in radial sense, like the cords of the carcass ply. These metal cords have a 3 × 4/0.22 high elongation formation, namely are formed by three strands, each of which is composed of four wires each having a diameter of 0.22 mm, strands and cords being all wound up in the same sense.

The breaker 7 of the tire consists of two layers of metal cords, respectively indicated with 8 and 9, having a width equal to that of the tread 10, and of a strip of nylon cords 11 superimposed to the layer 9 and extending beyond the tire shoulder.

The cords of strip 11 are arranged in a direction parallel to the equatorial plane of the tire.

Each sidewall of the tire comprises the reinforcement 12, constituted by a fabric of textile cords, arranged in axially outer position with respect to the carcass, its turn-up portion 3 and the strip 6.

As can be noted from the drawing, the reinforcement is so folded as to have a larger skirting 13, extending along the whole sidewall, from the zone of the relative bead core as far as the shoulder, and a smaller skirting 14, directed outward, which extends from the shoulders as far as one half of the section height H of the tire.

The folding edge lies substantially adjacent to the layer 9 of the breaker; in this way, the strip of nylon cords 11 covers the folding edge and extends beyond the edge, for a width corresponding to 30% of the width of the skirting 14.

The cords of reinforcement 12 are made of nylon 6, and are inclined, with respect to the circumferential lines of the tire, at an angle which is of 23° at the bead zone and which varies, along the travel of the cords, until in the shoulder zone the cords belonging to the skirting 13 are at about 20° and belonging to the skirting 14 are at about 25°. This variation of inclination, of small value, is due to the fact that, during the tire manufacture, in particular during its shaping in its uncured state to toroidal form, the textile cords of the reinforcement are subjected to stresses in the circumferential direction, whose entity is different in the various zones of the tire sidewall, namely are minimum at the bead and gradually higher in the direction of the radially axially outer zone.

Although the invention is described in detail for the purpose of illustration, it is to be understood that such detail is solely for that purpose and that variations can be made therein by those skilled in the art without departing from the spirit and scope of the invention except as it may be limited by the claims.

I claim:

1. In a pneumatic tire for vehicle wheels comprising a radial carcass, a tread, a bead containing a bead cord and a breaker arranged between the carcass and the tread, the improvement wherein the carcass has at least one ply of cords lying in substantially radial planes, said cords extending from one bead to the other and being turned up about the bead core contained in each bead from the inner side towards the outer side of the tire, each bead comprising a filling of high rigidity rubber arranged on the core, the lower zone of each sidewall comprising at least one strip of metal cords arranged with said cords inclined at 90° with respect to the circumferential lines of the tire, in an axially outer position with respect to the turn-up of said carcass and extending radially from the core zone to at least a height equal to 45% of the section height of the tire, and said breaker comprises at least two superimposed layers of cords of threads or wires of a material selected between textile or metallic material having a width corresponding at least to that of the tread, said breaker cords being parallel to one another in each layer and crossed with respect to those of the adjacent layer, and being inclined at an angle ranging between 10° and 35° with respect to the equatorial plane of the tire and, in a radially outer position with respect to said two layers, at least one strip of textile cords arranged in a direction parallel to the equatorial plane of the tire, having a width greater than that of said two layers, said textile cords being made of a material which reduces in length under the action of heat, characterized in that the tire also comprises, in each sidewall, a reinforcement made of a fabric of cords of threads or wires of a material selected between textile or metallic material, arranged in an axially outer position with respect to the carcass and to its turn-up in such a way that said cords, parallel to one another, are inclined, with respect to the circumferential lines of the tire, at an angle ranging between 20° and 30°, said reinforcement being so folded as to have a greater skirting extending from the bead core zone as far as the tire shoulders and a smaller skirting extending from the shoulder zone as far as one half of the section height of said tire, the folding edge of said reinforcement lying substantially adjacent to the layers of cords of threads or wires of a material selected between textile or metallic material of said breaker and underlying said strip of textile cords of the breaker itself.

2. A pneumatic tire as in claim 1, characterized in that said reinforcement of fabric of cords of threads or wires of a material selected between textile or metallic material has its smaller skirting arranged in an axially outer position.

3. A pneumatic tire as in claim 1, characterized in that said strip of textile cords of the breaker covers said reinforcement for an extension of between 10% and 30% of the extension of the smaller skirting of said reinforcement.

4. A pneumatic tire as in claim 1 characterized in that the textile material constituting the cords of said reinforcement consists of a polyamide, selected among aliphatic polyamides and aromatic polyamides.

5. A pneumatic tire as in claim 1 characterized in that it comprises, wound up about each bead core, at least one flipper, whose ends extend radially outwardly as far as one half of the section height of the tire.

6. A pneumatic tire as claim 5, characterized in that said flipper consists of a strip of cords of a material selected between textile or metallic material, inclined with respect to the circumferential lines of the tire at an angle ranging between 20° and 25°.

7. A pneumatic tire as in claim 5, characterized in that said flipper consists of a rubber strap having a thickness ranging between 6 and 10 mm, and a hardness equal to at least 85° Shore A.

8. A pneumatic tire for a motor vehicle comprising
a. a tread,
b. beads each having a core cord which extends around the tire, and a filling of an elastomeric material about the cord,
c. a carcass having a toroidal shaped cross-section open on its radial inner side and having sidewalls integral with the beads and a closed side adjacent to the tread, said carcass comprising at least one ply of radially disposed cords which extend through the sidewalls and the portion underlying the tread from one bead to the other and about the core cords with the end portions of the radially disposed cords being disposed around the bead core cord and axially outwardly towards the external surface of the carcass, a strip of metal cords substantially perpendicular to the circumferential axis of the tire and disposed in each sidewall axially outwardly of the said radially disposed cords and from adjacent to the bead to a height of 45% or more of the section height of the tire,
d. a breaker member disposed between the carcass and tread and comprising at least two superimposed layers of cords, said breaker member having a width at least equal to the width of the tread, the cords of each layer being parallel to each other and disposed at an angle whereby they cross the cords of the adjacent layer and are inclined at an angle of from 10° to 35° with respect to the equatorial plane of the tire, and a layer of heat skrinkable cords disposed parallel to the equatorial plane of the tire and radially outwardly over the said superimposed layers of cords, the layer of heat shrinkable cords being wider than the superimposed layers; and
e. in each sidewall, a reinforcing ply of cords disposed radially outwardly of the said end portions of the radially disposed cords, the cords of the sidewall reinforcing plies being parallel to each other and inclined at an angle of 20° to 30° with respect to the circumferential line of the tire, said reinforcing ply having a folded edge disposed between the breaker member and the said radially disposed cords which are turned about the bead core cord, said folded ply extending along the width of the sidewall to the bead core and a second portion axially outwardly from the first portion which extends from the fold through about one-half of the section height of the tire.

* * * * *